May 27, 1941. W. E. HORROCKS Re. 21,810

SELF-CONTAINED THRUST BEARING

Original Filed Aug. 3, 1936

INVENTOR
Walter E. Horrocks
BY John A. Bonnhardt
ATTORNEY

Reissued May 27, 1941 Re. 21,810

UNITED STATES PATENT OFFICE 21,810

SELF-CONTAINED THRUST BEARING

Walter E. Horrocks, Lakewood, Ohio

Original No. 2,168,342, dated August 8, 1939, Serial No. 94,074, August 3, 1936. Application for reissue July 20, 1940. Serial No. 346,663

10 Claims. (Cl. 308—232)

My invention relates to self-contained thrust bearings of the anti-friction type, such as ball bearings, cylindrical roller bearings and taper roller bearings and has for its principal object to provide improved means for combining elements, metals, alloys and lubricants into a complete working unit for bearings of this nature. It has been illustrated in connection with bearings of the type that are extensively used as automobile clutch throw-out bearings but it is not limited for use in this location.

Bearings of this nature have proved unsatisfactory due to various causes such as eccentric throw of retainer rings in which the balls are assembled, the eccentric throw being caused when the bearing is running free with the race rings slightly separated to remove the load.

Another cause of bearing failure to withstand constant heavy duty service in which they are used, such as clutch release bearings as are used in trucks, is caused by bearing structures such as those in which the function of the bearing and its coacting parts depend upon the shaft or hub to which the bearing is applied for maintaining the axial alinement of the races and co-acting parts in which the bore of the fixed race ring allows a very small limited contact on the shaft for the supporting of the bearing axially, which results in allowing considerable drag, and excessive unlubricated frictional contact between the shaft and the hub of flanged retainers that are in constant frictional contact with the shaft and both race rings when the bearing is being placed under a working load.

One of the objects of my invention relates to an improvement in self-contained thrust bearings having for its object improved means for the maintaining of axial alinement of the opposing races combined with an enclosed bearing separator for maintaining concentric alinement of the balls, or rollers, positioned between the opposing race members.

Another object is to provide a self-contained thrust bearing which can be installed over a shaft without the separator or retainer, or component parts being subjected to damage during installation, or becoming inoperative due to imperfect fitting of the tight race ring upon the shaft, or irregularities in the shafting.

Another object is to provide a self-contained thrust bearing in which the races and component parts that revolve around the shaft to which the bearing is applied, are not in contact with the shaft, thereby eliminating any wear or friction between the shaft and the thrust bearing parts.

Another object is to reduce the number of running fits in retainers of the flanged type, in which the retainers are journaled to the shaft and to the races.

A still further object is to provide a self-contained thrust bearing in which the component parts that are subjected to frictional wear are interchangeable with different combinations of metal, or materials to reduce any frictional wear.

An important object also is the provision of a self-contained thrust bearing, having the foregoing advantages and merits, whereby the rolling elements are allowed to shift independently between the race rings so as to eliminate the occurrence of any snap action resulting from the mass of rollers simultaneously contacting both opposing race rings.

My invention is especially designed for, but not necessarily confined to, thrust bearings in which the thrust bearing faces of the opposing races are permitted to separate slightly when the bearing is running free and is not under a load, as is extensively used in connection with automobile clutches.

This invention is also designed to allow of making a self-contained thrust bearing using race members having straight or flat opposing surfaces for the positioning of ball bearings having a point contact with the race members, cylinder roller bearings having a line bearing contact with the race members, ball and cylinder roller bearings being interchangeable between the same opposing race rings, grooved race members for positioning of ball bearings between the grooves of the opposing races, and race members having conical opposing surfaces for the positioning of taper roller bearings having a line bearing contact with the race members.

In order to accomplish these specified results I may use a separator as granted to me in Patent No. 1,941,209 issued December 26, 1933, which allows for a separator comprising a ring with spokes, or projections extending between the rollers, with the sides of the spokes, or projections adjacent to the rollers, being flat to allow for free axial movement between the opposing race members. This separator preferably, but not necessarily, to be made from powdered metal alloys.

The axial alinement of the race rings is maintained by the use of a sleeve which is fixed to the tight race ring and the concentric alinement of the rolling elements is maintained by using a separator comprising a ring with projections extending inward, with the ends of the projections journaled on the sleeve of one race ring, or a separator being journaled on the sleeve of one race ring with projections extending outwardly and with the aforesaid projections or spokes having open ends and provided with straight tangential contacting means across the rolling elements.

By using the described separators and the free moving race ring journaled on the sleeve of one race ring as shown in the drawing and as specified, it will be apparent that the combinations which are described will allow for the manufacture of a self-contained thrust bearing, which is suitable for either ball or roller bearings, and will insure axial alinement of the races and concentric alinement of the rolling elements that are positioned between the opposing race members.

With the above and other objects in view, an embodiment of the invention is shown in the accompanying drawing in which.

Figure 1:
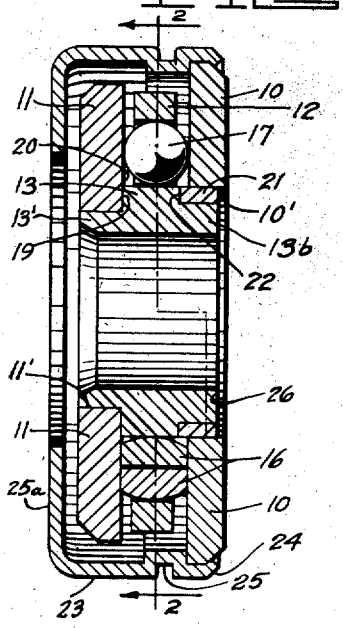
Fig. 1 is a view in section taken through the center line of the bearing.
Figure 2:
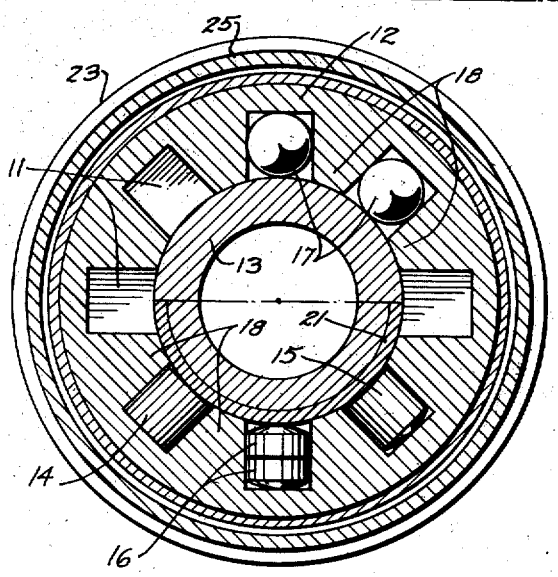
Fig. 2 is a view, partially in side elevation and partially in section approximately on the line 2—2 of Fig. 1, showing a self-contained bearing of the thrust type constructed as described in the invention adapted for the use of either ball or cylindrical rolling elements.

Referring to the drawing, at Figs. 1 and 2 is shown a thrust bearing containing ball and roller bearings, comprising axially spaced race members 10 and 11 and a separating ring 12 which is journaled on a sleeve 13 of the fixed race ring 11. Rolling load members 14, 15, 16 or 17 are positioned between the projecting portions 18 of the separating ring 12 which maintains the rolling elements 14, 15, 16 or 17 in concentric alinement.

The sleeve 13 on which the separator 12 is journaled is fixed to the race ring 11 by press fitting the reduced end 13' of the sleeve 13 into the bore 11' of the race ring 11 with the shoulder 19 of the sleeve 13 seated to the inner face 20 of the race ring 11.

The sleeve 13 on which the separator 12 is journaled, may have an extra journal bearing band 21 which is to be made from elements other than those contained in the sleeve 13. The object of this feature is to obtain additional advantages by arranging different combinations of the elements or alloys that come in frictional contact with each other. The journal bearing band 21 is press fitted onto the shouldered end 13b of the sleeve 13 and seated against the shoulder 22 of the sleeve 13 as shown.

The free acting race ring 10 is journaled on to the sleeve 13, or the journal bearing band 21, as the case may be, which maintains the axial alinement of the race rings 10 and 11 either when they are allowed to separate, as when the bearing is not under a load, or as when the bearing is operating under a load with the races 10 and 11 and the rolling elements 14, 15, 16 or 17 being in contact with each other.

The entire bearing is held together with a casing or jacket 23 which is secured to the free moving race 10 by spinning the edge 24 of the jacket or casing over the outer end of the race 10, the race 10 being shouldered on to a bead 25 which is rolled into the casing or jacket. The casing or jacket 23 has a flange 25a extending axially to embrace the race 11 with a small amount of clearance allowed between the inner side of the flange 25a and the race 11.

The interior void space of the bearing is filled with a suitable grade of lubricant adapted for the lubrication of the rolling elements 14, 15, 16 or 17 and the contacting component parts of the bearing.

When the bearing is to be installed over a shaft or hub, pressure is applied to the end 26 of the sleeve 13 which eliminates any possibility of damaging any of the component working parts of the bearing.

The sleeve 13 being substantially secured within the bore 11' of the fixed race 11 and extending into the bore 10' of the free moving race 10 isolates, or separates, all co-acting movable parts of the bearing from any contact with the shaft or hub, to which the bearing may be applied. This feature results in reducing the number of frictional radial contacts and running fits of the component parts of the bearing to a minimum.

Installation of the bearing with the sleeve 13 pressed over a shaft or hub that is slightly out of round, or of irregular dimensions, will not negative the bearing from maintaining axial alinement of the races, and concentric alinement of the load bearing rolling elements.

Figure 3:
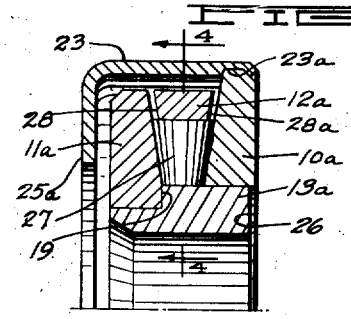
Fig. 3 is a partial view in section showing the invention as applied to taper roller bearings.
Figure 4:
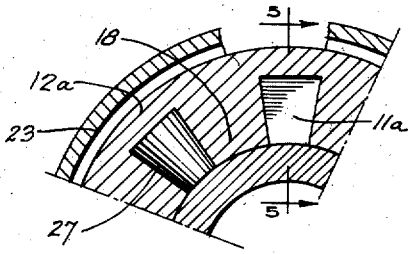
Fig. 4 is a fragmentary view in section as is shown on the line 4—4 of Fig. 3 showing the separator projections journaled to the sleeve, with one taper roller in position and one open roller pocket.
Figure 5:
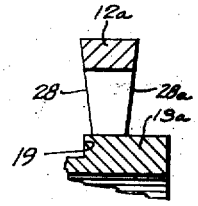
Fig. 5 is a view in section on line 5—5 of Fig. 4 which shows a cross section of the separator journaled to the sleeve as used with taper roller bearings.

Figs. 3, 4, and 5 illustrate the invention applied to taper roller bearings 27 in which the separating ring 12a has the side faces 28 and 28a tapered to conform with the faces of the opposing races 10a and 11a. The casing 23 is shown secured to the race ring 10a by shell reaming the end of the casing to form a shoulder 23a for the seating of the race 10a with the edge of the casing spun over the chamfered corner of the race as shown.

Figure 6:
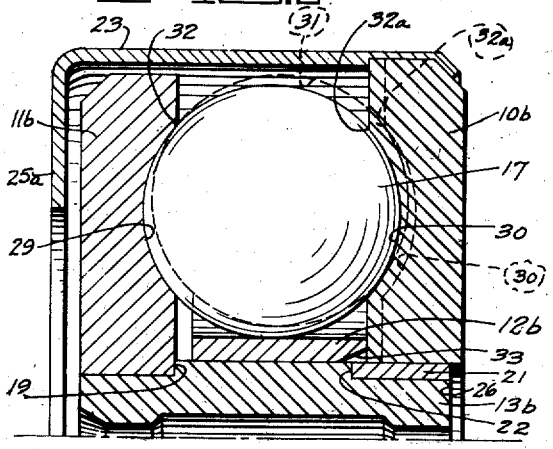
Fig. 6 is a partial enlarged section view showing the invention as applied to ball bearings which track in grooved races.

Fig. 6 illustrates the invention applied to ball bearings 17 which track in grooves 29 and 30 of opposing races 10b and 11b in which the dotted concave line 30 shows the location of the inner face of the free moving race 10b as when the bearing is running free without any load which allows the races 10b and 11b to separate slightly. The circular dotted line 31 indicates the position of the balls 17 in relation to the grooves 29 and 30 as when the bearing is not under a load, but is revolving at high speed resulting in the centrifugal action maintaining concentric alinement of the ball bearings 17 by contact with the outer periphery 32 and 32a of the grooves 29 and 30 respectively.

When the bearing is under a load and the thrust race 10b is thrust toward the opposing race 11b the balls 17 will assume the position in the grooves 29 and 30 as indicated, being maintained in concentric alinement by the outer periphery 32 and 32a of the grooves 29 and 30, the separating ring 12b which is journaled on the sleeve 13b with the corner 33 of the separator 12b adjacent to the journal bearing band 21 chamfered to avoid any frictional contact with the said journal bearing band 21.

Figure 7:
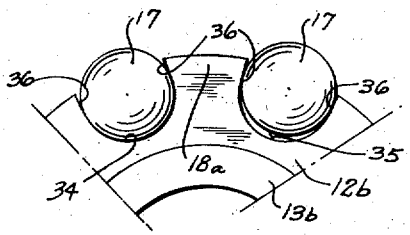
Fig. 7 is a fragmentary view of the ball bearing separator showing the position of the balls in the separator when the bearing is operating under a load, and as when the bearing is running free and is not operating under a load.

Fig. 7 illustrates the separator 12b journaled to the sleeve 13b with a ball bearing 17 positioned between the outwardly projecting portions 18a in contact with the separator 12b at the point 34 as when the bearing is in operation under a load. When the bearing is running free and is not under a load the balls 17 assume the position between the projections 18a as shown at 35. The variable concentric alinement of the ball bearings 17 as caused when the bearing is running free and not under a load, and as when the bearing is running under a load, is accomplished by the straight sides 36 of the separator projections 18a which allows the balls 17 to shift from one concentric alinement into another concentric alinement maintaining the equal spacing of the balls 17 within the bearing.

If the fixed races 11, 11a, 11b and the sleeves 13, 13a, and 13b are to be made of the same elements, the two pieces can be combined in one piece in a forging, stamping, or casting, thereby eliminating the joining between the race and the sleeve at the shoulder 19.

From the foregoing description the operation of the invention will be apparent as the sleeve which is attached to one race ring allows of free axial reciprocative movement of the opposing race ring, and the separators that are journaled thereto. The casing that is attached to the free moving race ring, for holding the selected lubricants within the bearing, makes a bearing that is a self-contained unit with all of the component parts of the bearing functioning within itself for the maintaining of axial and concentric alinement of the co-acting functioning elements.

This will allow in manufacturing of bearings of this type, to have all of the movable parts assembled into a complete unit under the supervision of the bearing manufacturer, thereby eliminating the dependency of multiple running fits to outside sources for the functioning of the bearing.

This improvement provides a self-contained thrust bearing having a retaining element for spacing the rollers that is maintained in concentric alinement at all times and which allows of the rolling elements to freely shift between the races so that they may roll independently into their working positions between the race rings when a working thrust load is applied to the bearing. This results in eliminating any mass snap action of the rolling elements against the working surfaces of the opposing race rings when a sudden impact or thrust load is applied to the bearing. The elimination of the mass snap action of the rolling elements against the working surfaces of the race rings results in tending to obviate the Brinelling of the working surfaces of the opposing race rings, and the premature Brinelling of the race rings is eliminated by applying pressure to the sleeve of the bearing instead of applying pressure to the race rings when the bearing is to be forced over a shaft. The mass snap action of the rolling elements during the function of a thrust bearing is ever present in all types of bearings utilizing retainers which embrace the rollers and prevents the rollers to freely shift independently between the opposing races so that they may roll individually into position between the race rings when placed under a working load.

It will be understood that slight modifications can be made of this invention without departing from the spirit of the scope of the invention.

Having described my invention, what I claim and desire to secure by Letters Patent is:

1. In a self-contained thrust bearing comprising a pair of complementary grooved opposing race rings, one of the race rings having a sleeve attached thereto, the opposing race ring carrying a confining casing and journaled on the said sleeve for free rotatable and reciprocatory axial movement thereon, and balls with rolling fluctuating radial movement shifting individually between the said rings, and a relatively thick open spoked ring separator for the balls diametrically journaled and axially movable on the said sleeve between the said rings, and provided with a contour formed about the rolling surfaces of the balls and projecting substantially therebetween, and the said contour having straight tangential contacting means lying across the surfaces of the balls in all their fluctuating positions between the said rings thereby maintaining equally spaced changeable concentric alinement of the rolling balls between the said rings.

2. In a self-contained thrust bearing comprising a pair of complementary grooved opposing race rings, one of the race rings having a sleeve attached thereto, the opposing race ring carrying a confining casing and journaled on the said sleeve for free rotatable and reciprocatory axial movement thereon, and balls with rolling fluctuating radial movement shifting individually between the said rings, and a relatively thick open spoked ring separator for the balls diametrically journaled and axially movable on the said sleeve between the said rings, and provided with a contour formed about the rolling surfaces of the balls and projecting substantially therebetween, and the said contour having straight tangential contacting means lying across the surfaces of the balls in all their fluctuating positions between the said rings, thereby maintaining equally spaced variable concentric alinement of the rolling balls between the said rings.

3. In a self-contained thrust bearing comprising a pair of complementary grooved opposing race rings, one of the race rings having a sleeve attached thereto, the opposing race ring carrying a confining casing and journaled on the said sleeve for free rotatable and reciprocatory axial movement thereon, and balls with rolling fluctuating radial movement shifting individually between the said rings, and a relatively thick open spoked ring separator for the balls diametrically journaled and axially movable on the said sleeve between the said rings, and provided with a contour formed about the rolling surfaces of the balls and projecting substantially therebetween, and the said contour having straight tangential contacting means lying across the surfaces of the balls in all their fluctuating positions between the said rings, thereby maintaining equally spaced rolling formation of the balls to roll from one concentric alinement into other concentric alinements between the said rings.

4. In a unitary self-contained thrust bearing comprising a pair of complementary conical faced opposing race rings with one of the race rings having a sleeve attached thereto and the opposing race ring carrying a confining casing and journaled on the said sleeve for free rotatable and reciprocatory axial movement thereon, tapered rolling elements between the said rings, and a relatively thick open spoked ring separator for the rolling elements, diametrically journaled and axially movable on the said sleeve between the said rings, and the separator provided with portions extending radially between the tapered rolling elements. and the said portions provided with straight tangential contacting means lying across the rolling surfaces of the said rolling elements in all their shiftable positions between the said rings, whereby equally spaced changeable concentric alinement of the said rolling elements is maintained between the said rings.

5. In a unitary self-contained thrust bearing comprising a pair of complementary opposing race rings with one of the race rings having a sleeve attached thereto and the opposing race ring carrying a confining casing and journaled on the said sleeve for free rotatable and reciprocatory axial movements thereon, rolling elements between the said rings, and a relatively thick open spoked ring separator for the rolling elements provided with flat-sided projections extending radially between the rolling elements and journaled on the said sleeve and axially movable between the said rings whereby equally spaced changeable concentric alinement of the rolling elements is maintained between the said rings.

6. In a unitary self-contained thrust bearing comprising a pair of complementary opposing race rings, one of the race rings having a sleeve attached thereto, the opposing race ring carrying a confining casing and journaled on the said sleeve for free rotatable and reciprocatory axial movement thereon, rolling elements between the said rings, and a relatively thick open spoked ring separator for the rolling elements, diametrically journaled and axially movable on the said sleeve between the said rings, and the separator provided with portions extending radially between the rolling elements, and the said portions provided with straight tangential contacting means lying across the rolling surfaces of the rolling elements in all their shiftable positions between the said rings, whereby equally spaced changeable concentric alinement of the rolling elements is maintained between the said rings.

7. In a unitary thrust bearing, the combination of a fixed race ring and a loose race ring having a confining casing attached thereto, said rings being co-axially spaced on a sleeve, rolling elements between the rings and means providing a relatively thick separator diametrically journaled and axially movable on the sleeve between the rings comprising a ring having open roller-spacing projections extending radially between the rolling elements and provided with straight tangential contacting means lying across the rolling surfaces of the rolling elements whereby the rolling elements have individualized changeable concentric alinements between the rings when the said rings move toward each other.

8. A self-contained thrust bearing comprising a sleeve, a pair of race rings one of which is fixed and the other of which carries a confining casing and is axially movable on the sleeve, rolling elements between the races, and an open spoked ring separator for the rolling elements, rotatable and axially movable on the sleeve between the races, and straight tangential contacting means on the separator to allow of the rolling elements independently shifting their axial concentric alinement between the rings.

9. A self-contained thrust bearing comprising a sleeve, a pair of race rings one of which is fixed and the other of which carries a confining casing and is axially movable on the sleeve, rollers between the races, and an open spoked ring separator for the rollers, journaled and axially movable on the sleeve between the races, and straight tangential contacting means on the separator to allow of the rollers individually changing their concentric alinement between the rings.

10. In a unitary self-contained thrust bearing, the combination of a fixed race ring and a loose race ring having a confining casing attached thereto, rolling elements between the rings, and an open spoked ring separator for the rolling elements and means providing a sleeve for journaling said separator and co-axially spacing said race rings thereon substantially as described.

WALTER E. HORROCKS.